Patented Mar. 28, 1950

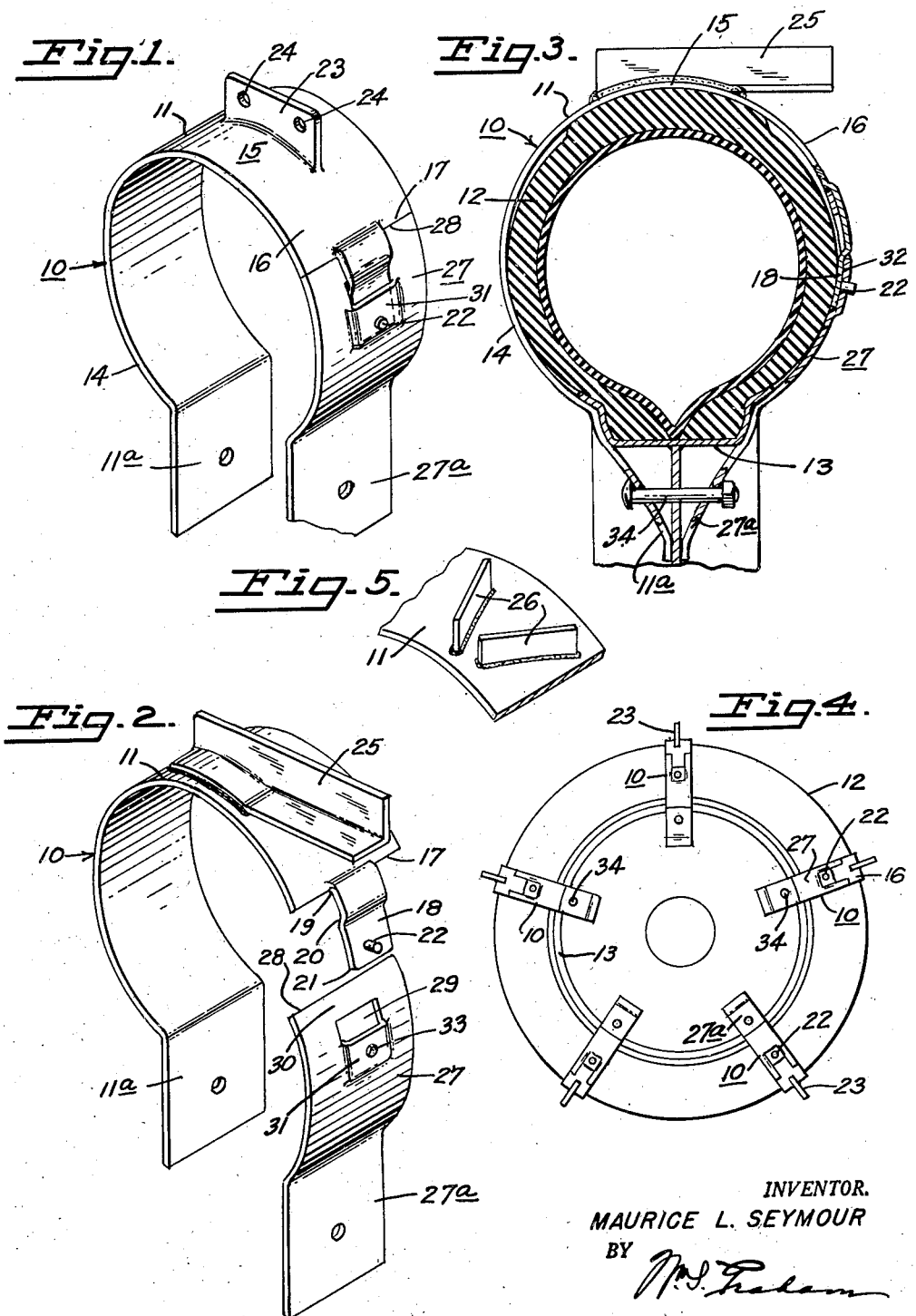

2,501,973

UNITED STATES PATENT OFFICE 2,501,973

GROUTER FOR TRACTOR WHEELS

Maurice L. Seymour, Berkeley, Calif.

Application July 12, 1948, Serial No. 38,289

5 Claims. (Cl. 152—227)

This invention relates broadly to grouters for vehicle wheels and more particularly to auxiliary grouter attachments which may be mounted on wheels having pneumatic tires for facilitating traction engagement with the ground surface upon which the vehicle is operated.

It is well known that there are many types of devices for facilitating gripping of vehicle wheel on a traction surface, such as transverse integral metal cleats on metal rims or fellies of farm implement wheels. Of recent years, however, farm implements have increasingly turned to the use of pneumatic rubber tread tires, and where the soil condition is adaptable, the traction unit has tended to a reduction of weight, and implementation of the reduced weight by transverse ridges or other formed designs of the rubber tread for gripping the ground or surface of the roadway. Due to the resilience of the pneumatic tire and the liability to tearing and cutting of the tread upon rocks or roadways, it has been necessary to make rubber traction cleats or other form of gripping means, relatively large in face area, resulting in the support of the wheels upon the surface of the ground instead of digging into the ground to facilitate a firm non-slip grip. In muddy or soft friable soil, or on moist grass surfaces, this causes slippage of the treads. Resort has been had to weighting of the wheels to give better traction grip, but this expedient, though helpful in a degree, depends on the amount of added weight and added weight on the wheels is no different than increasing weight of the vehicle itself. Obviously, all traction conditions are not uniform and it is desirable to have a traction means in which the traction may be increased or decreased to meet the instant condition.

It is also to be contemplated that a vehicle in many instances must be driven for substantially long distances on roadways when the need for gripping means on the treads is not necessary for traction and if not resilient is damaging to the roadway surface, and is not comfortable to the driver, so that under such conditions the resilient pneumatic tire is the most desirable tread for the wheels.

Therefore, an object of the invention is to provide an auxiliary removable grouter tread for pneumatic tire treads of vehicle wheels which may be readily installed and removed.

Another object is to provide a grouter device for pneumatic tire vehicle wheels in which the side walls of the grouter have a degree of resilience, cooperating with the resilience of the side walls of inflated pneumatic tires.

A further object is to provide a grouter device for pneumatic tire vehicle wheels in which may be conveniently installed or removed without great effort and with only the ordinary wrench which is usually carried in all vehicles of the type for which the grouter is adapted.

Yet, a further object is to provide a grouter device of severable inter-engageable parts mutually supporting at relatively contacting edge portions and inter-engaged for releasably secured interlock.

A still further object is to provide a grouter device rugged in construction, simple in installation, efficient in operation, and economical to manufacture, and generally to improve upon known grouter devices.

With the foregoing and other objects in view which will be apparent from or further explained herein, one form in which the invention may be exemplified is described herein and illustrated in the accompanying drawing, it being understood that various changes of details of structure may be resorted to by substitution of equivalence without departing from the spirit of the invention which is defined in the appended claims.

In the accompanying drawing—

Fig. 1 is a perspective view of the device of the invention.

Fig. 2 is an exploded perspective view of the grouter device of Fig. 1, but including a modified form of lug on the traction face of the grouter.

Fig. 3 is a lateral transverse end view partly in section of the device of Fig. 2 in assembled form, and illustrating the mounting thereon of a vehicle wheel rim and tire, the rim and tire being in section.

Fig. 4 is a side elevation of a pneumatic tired wheel having a plurality of the grouter devices spaced therearound.

Fig. 5 is a fragmentary perspective view of a modified form of traction or lug member on the tread face of the grouter of the invention.

Referring to the drawing in which like reference characters indicate corresponding parts in the several views, 10 indicates generally the grouter device of the invention, which is composed of a pair of inter-engaged resilient metal plates arcuately formed in the plane transversely of the wheel tire and rim and of substantial width longitudinally of the circumference of the traction tread of the tire on which it is to be transversely mounted. One of the arcuate plates 11, called the tread plate, conforms generally to the transverse arc of the exterior wall of an inflated pneumatic tire 12, and is of greater arcuate length than the one-half of the exposed wall of the tire from the wheel rim 13, so that the tread plate 11 extends around one side wall of the tire as at 14, across the traction face of the tread as at 15, and partially overlies the opposite side wall of the tire as at 16, terminating at a free end portion of the plate.

At its free end portion 16 the tread plate 11 is provided with an end edge 17 substantially perpendicular to the side edges of the plate, said end edge having mounted centrally thereof an extended buckle tongue 18 preferably formed integral with the plate by radially outwardly upforming the plate material at the connection thereof to the extent of the thickness of the plate metal of which the arcuate walls of the grouter are formed, as shown at 19, and forming the tongue radially inwardly intermediate its ends to substantially the same extent as the said upforming thereof, as shown at 20, the tongue, with the exception of said interruptions of its arc, being substantially of the same arc as the tread plate. Adjacent its free end 21 the tongue is provided with a locking pin 22. The purpose of the previously described portion of the tongue will be further referred to in connection with the second plate to be described.

On the outer peripheral face of the tread plate at the traction portion 15, the tread plate is provided with suitable teeth or lugs for gripping into the surface of the ground, and thus providing the improved traction which is the purpose of the invention to provide. These tread lugs may be of any suitable ground-gripping form, several of which are illustrated, having various advantages. The form of the lug 23 in Fig. 1 has the advantage of simplicity, economy, ease of welded connection to the arcuate plate, and ready adaptability to connection of an additional extension lug by bolts through holes 24. The lug 25 shown in Figs. 2 and 3 comprises a strip of angleiron of a length to extend beyond the width of the grouter transversely of the tire and provides greater gripping capacity in the ground surface due to its extended length, and therefore, in order to obtain equal gripping area with the lug of Fig. 1, the lug of Figs. 2 and 3 may be made with a gripping edge of less height than the lug of Fig. 1, the angleiron form providing strength. The lugs 26 of Fig. 5 provide a pair of converging lugs which have the advantages of increased area of ground gripping traction, have somewhat greater facility for entering hard ground because the ends of small area enter the ground first and the remainder of the lug enters the ground progressively as the wheels rotate. However, the angleiron lug 25 of Figs. 2 and 3 is a preferred form since grouters are generally employed to compensate for lack of weight of a vehicle and the advantage of greater gripping area is preponderant.

The second plate of the grouter, which is called the side plate 27, is, like the tread plate first described, also an arcuate plate, preferably of resilient spring plate metal, having substantially the same degree of arc as the first described plate, but of shorter length, extending from the opposite side wall of the wheel rim 13 to meet the free end edge of the tread plate, having at its free end an edge 28 the entire width of the plate and preferably perpendicular to the side edges. Adjacently spaced from said free edge and centrally of the plate is an opening 29, leaving an edge strip of plate area 30 between the opening 29 and the free edge of the side plate. Adjoining the edge of the opening 29 farthest removed from the free edge, the metal of the side plate has an integral upset portion 31 formed radially outwardly to provide a pocket 32 at the inner face of the side plate, the upset wall of the pocket having an opening 33 therethrough.

Both the tread plate and the side plate have, at their ends, adjacent the wheel rim 13, an attaching flange, respectively 11a and 27a, which engage the exterior side walls of the wheel rim and are of a length to extend radially inwardly beyond the felly of the wheel rim. The flanges each have a hole therethrough for receiving a crossbolt 34 passing radially inwardly of the rim felly.

It is sometimes necessary and desirable to increase the traction grip of relatively lightweight vehicles by adding disc weights to the wheels. The wheels of such vehicles are usually of the disc plate type rather than the spoke type and the weights which are added are discs having a central opening to fit over the wheel hub and are bolted through suitable holes in the central portion of the discs of the wheel. It is to be understood that if the bolt holes for weights are suitably located, the fastening bolts for the grouters of this invention may also employ the same holes in the disc wheels in which case a single bolt may both fasten the grouter to the wheels and also support the weights.

From the foregoing description of the parts and in view of the well-known function of a cleat on a wheel to increase traction grip, the functional operation of the elements of the device to provide a ground gripping grouter may be described very briefly. The tread plate and the side plate are of spring plate metal of suitable thickness commensurate with the weight of vehicle and size of tires. Being in two-plate pieces, it is preferable that the two pieces be partially assembled before final connection to the wheel. To so partially assemble them, they are relatively positioned so that the free end 21 of the tongue 18 may be slid through the opening 29 and upon bringing the plates more into uniform arcuate symmetry the pin 22 engages in the opening 33 to loosely hold the plates relatively for mounting them around the vehicle tire, which may be readily accomplished because the tongue loosely in the opening 29 and the pin loosely in opening 33 act in the nature of a hinge which loosely hold the adjacent ends of the plate together, yet permits the plates to be relatively spread at the flanged ends, which are then slid around the side walls of the tire. When the flange ends are positioned around the side walls of the tire, the flanged ends are pressed relatively inwardly toward each other to contact the outer side walls of the wheel rim as shown best in Fig. 3, whereupon the bolt 34 is inserted through the flange opening and through a corresponding opening in the disc of the wheel and are thereupon tightened to bring the flanged ends of the respective plates tightly into contact with the side walls of the wheel rim. Upon tightening the bolts, the pin 22 snugly seats in the opening 33, the free end portion 21 of the tongue of the tread plate snugly seats in the formed pocket 32 of the side plate, the central portion of the cross strip 30 seats in the upformed portion of the tongue and the transverse free edges 17 and 28 of the respective plates come into relative confronting or face-to-face weight-bearing contact, forming a smooth uniformly arcuate inner face to the grouter wall, and providing an inter-engagement of parts to provide a releasable lock of spliced metal parts wherein stress of weight is borne by the contacting edges of the plates.

Obviously the grouter may be removed from a tire with facility by reversal of operations of attachment.

As many of the grouters may be employed on a wheel as the conditions require, and depending primarily on the size of the wheel and the character of the soil, grass, or ground conditions, five of such grouters being illustrated as an example in Fig. 4.

Having described the invention, I claim:

1. In a grouter device of the character described, a pair of arcuate plates, each plate being provided at one end with a free edge and with means at the opposite end for relative cooperation in securing them, respectively, to opposite sides of the rim of a vehicle wheel, a first of said plates being of arcuate length to extend from one side of a vehicle rim more than half the circumference of a tire thereon, whereby the plate will overlie one side wall, the traction tread and a portion of the opposite side wall of the wheel tire, and the other of said plates being of arcuate length to extend from the opposite side of the wheel rim to the free end edge of said first-mentioned plate, means to releasably interengage the free end portions of said plates, including an orifice in one plate and a tongue on the other plate adapted for sliding into said orifice, said first plate having a lug extended radially outwardly from the exterior of its portion which overlies the traction tread of the tire.

2. In a grouter device for vehicle wheels, the combination of a pair of arcuate plates, each provided with a free edge substantially perpendicular to arcuate side edges of the plate and each plate being provided with flange means at its opposite ends for relative cooperation in securing them, respectively, to opposite sides of the rim of a vehicle wheel, a first of said plates being of arcuate length to extend from one side of a vehicle rim more than half the circumference of a tire thereon, and the other of said plates being of arcuate length to extend from the opposite side of the wheel rim to the free end edge of said first mentioned plate, said perpendicular free end edges of the plates being adapted for relative confronting contact, and means to releasably interengage the free end portions of said plates, including an orifice in one plate and a tongue on the other plate adapted for sliding into said orifice, and said first plate having a lug extended radially outwardly from the exterior of its portion which overlies the traction tread of the tire.

3. A grouter device for vehicle wheels, comprising a pair of arcuate plates, each plate having a free end and being provided with means at its opposite end for relative cooperation in securing the plates, respectively, to opposite sides of a rim of a vehicle wheel, a first of said plates being of arcuate length to extend from one side of a vehicle rim more than half the circumference of a tire thereon, and the other of said plates being of arcuate length to extend from the opposite side of the wheel rim to the free end edge of said first-mentioned plate, and means to releasably interengage the free end portions of said plates, including an orifice spaced from the free end of one plate and an adjoining pocket formed in the inner arcuate wall of said one plate, and a tongue on the other plate adapted for sliding into said orifice and the free end of the tongue being adapted to lie in said pocket whereby the free end portions of the plates may contact each other in confronting relation, said first plate having a lug extended radially outward from the exterior of its portion which overlies the traction tread of the tire.

4. A grouter for the tractor tread of vehicle wheels, including a pair of arcuate plates, each plate being provided with means at one of its ends for relative cooperation in securing them, respectively, to opposite sides of the rim of the vehicle wheel, the opposite end of one of said plates having its transverse edge portion substantially perpendicular to the arcuate side edges of said plate, and the opposite end portion of the other plate having a radially outward offset spaced adjacent its end to provide a transverse shoulder adapted to receive thereagainst the perpendicular transverse edge of the first mentioned plate, said last mentioned plate having a portion extending beyond said shoulder for overlying the end portion of the first mentioned plate when the transverse perpendicular edge of the first mentioned plate seats on said shoulder, means carried by one of said plates for releasably interengaging the other of said plates adjacent said shoulder, one of said plates being of arcuate length to extend from one side of a vehicle rim more than half the circumference of a tire thereon whereby such plate will overlie one side wall, the traction tread and a portion of the other side wall of the tire, and the other of said plates being of arcuate length to extend from the opposite side of the wheel rim to the interlocking end edge of the other of said plates.

5. A grouter for the traction tread of vehicle wheels, including a pair of arcuate plates, each plate being provided with means at one of its ends for relative cooperation in securing them, respectively, to opposite sides of the rim of the vehicle wheel, the opposite end of one of said plates having its transverse edge portion substantially perpendicular to the arcuate side edges of said plate, and the opposite end portion of the other plate having a radially outward offset spaced adjacent its end to provide a transverse shoulder adapted to receive thereagainst the perpendicular transverse end of the first mentioned plate, said last mentioned plate having a perforated portion extending beyond said shoulder for overlying the end portion of the first mentioned plate when the transverse perpendicular edge of the first mentioned plate seats on said shoulder, the underlying portion of the first mentioned plate having pins for releasably interengaging in the perforation of the other of said plates, one of said plates being of arcuate length to extend from one side of a vehicle rim more than half the circumference of a tire thereon whereby such plate will overlie one side wall, the traction tread and a portion of the other side wall of the tire, and the other of said plates being of arcuate length to extend from the opposite side of the wheel rim to the interlocking end edge of the other of said plates.

MAURICE L. SEYMOUR.

REFERENCES CITED

The following references are of record in the file of this patent:

UNITED STATES PATENTS

| Number | Name | Date |
| --- | --- | --- |
| 1,254,089 | Thomas | Jan. 22, 1918 |
| 1,350,966 | Glover | Aug. 24, 1920 |
| 2,438,656 | Crumrine | Mar. 30, 1948 |